United States Patent
Kim

(10) Patent No.: US 7,577,206 B2
(45) Date of Patent: Aug. 18, 2009

(54) OFDM SIGNAL RECEIVING APPARATUS AND METHOD FOR ESTIMATING COMMON PHASE ERROR OF OFDM SIGNALS USING DATA SUBCARRIERS

(75) Inventor: Dong-Kyu Kim, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 591 days.

(21) Appl. No.: 11/339,455

(22) Filed: Jan. 25, 2006

(65) Prior Publication Data
US 2006/0182015 A1 Aug. 17, 2006

(30) Foreign Application Priority Data
Jan. 25, 2005 (KR) .................. 10-2005-0006583

(51) Int. Cl.
H04K 1/10 (2006.01)
H04L 27/28 (2006.01)
(52) U.S. Cl. .................. 375/260; 375/233; 375/316; 375/326; 375/327; 375/340
(58) Field of Classification Search .............. 375/260, 375/233, 316, 326, 327, 340
See application file for complete search history.

(56) References Cited

U.S. PATENT DOCUMENTS

| 5,732,113 A | 3/1998 | Schmidl et al. ............ 375/355 |
| 6,198,782 B1 | 3/2001 | De Courville et al. ....... 375/341 |
| 6,240,146 B1 * | 5/2001 | Stott et al. .................. 375/344 |
| 6,359,938 B1 * | 3/2002 | Keevill et al. .............. 375/316 |
| 2006/0092902 A1 * | 5/2006 | Schmidt ..................... 370/342 |

FOREIGN PATENT DOCUMENTS

| KR | 10-2004-0050814 | 6/2004 |
| WO | WO 03/001760 | 1/2003 |

OTHER PUBLICATIONS

Optimum receiver design for wireless broad-band systems using OFDM. I Speth, M.; Fechtel, S.A.; Fock, G.; Meyr, H.; Communications, IEEE Transactions on vol. 47, Issue 11, Nov. 1999 pp. 1668-1677.*

Optimum receiver design for OFDM-based broadband transmission .II. A case study Speth, M.; Fechtel, S.; Fock, G.; Meyr, H.; Communications, IEEE Transactions on vol. 49, Issue 4, Apr. 2001 pp. 571-578.*

* cited by examiner

Primary Examiner—Ted Wang
(74) Attorney, Agent, or Firm—F. Chau & Associates, LLC

(57) ABSTRACT

An Orthogonal Frequency Division Multiplexing (OFDM) signal receiving apparatus and method of estimating a common phase error (CPE) using data subcarriers (and pilot subcarriers) instead of only pilot subcarriers. In the OFDM signal receiver, a channel measurement unit estimates a channel from a fast-Fourier-transformed signal to generate information about good subcarrier indexes as channel state information (CSI). A Common Phase Error (CPE) estimation unit estimates good pilot subcarriers and good data subcarriers from an equalized signal output from an equalizer (EQ) based on the channel state information (CSI), calculates the first and second common phase errors from the estimated pilot and data subcarriers respectively, and combines the first and second common phase errors to generate a final common phase error.

25 Claims, 6 Drawing Sheets

OFDM SIGNAL RECEIVING APPARATUS AND METHOD FOR ESTIMATING COMMON PHASE ERROR OF OFDM SIGNALS USING DATA SUBCARRIERS

CROSS-REFERENCE TO RELATED PATENT APPLICATION

This application claims the priority under 35 U.S.C. § 119 of Korean Patent Application No. 10-2005-0006583, filed on Jan. 25, 2005 in the Korean Intellectual Property Office, the contents of which is incorporated herein in its entirety by reference.

BACKGROUND OF THE INVENTION

1. Field of the Invention

The present invention relates to an OFDM (Orthogonal Frequency Division Multiplexing) signal receiver, and more particularly, to an OFDM signal receiving apparatus and method of estimating a common phase error (CPE) of received OFDM signals using data subcarriers in addition to pilot subcarriers.

2. Description of the Related Art

A multicarrier based OFDM signal may be used in a DVB-T (Terrestrial Digital Video Broadcasting) system. DVB-T (Digital Video Broadcasting) is a pan-European broadcasting standard (ETS 300 744) for digital terrestrial television. DVB-T is directly compatible with MPEG2-coded TV-signals. The introduction of this digital service is already in progress in various European countries.

In OFDM systems, modulation and demodulation can be done digitally by computationally efficient Fast Fourier Transforms (FFT) of finite length, N. The orthogonality of the consecutive OFDM symbols is maintained by appending a cyclic prefix (CP) of length GI at the start of each symbol. The CP is obtained by taking the last v samples of each symbol and consequently the total length of the transmitted OFDM symbols is N+v samples. The duration of the FFT window N is the duration of the "useful period" ignoring the Guard Interval (GI) period during which the receiving antenna is presumably polluted by a mixture of the new symbol & the delayed versions of the previous one (i.e.: the echoes—the ghosts). The receiver discards the CP and takes only the last N samples of each OFDM symbol for demodulation by the receiver FFT.

The DVB-T standard determines FFT-length (N) of 2 k and 8 k. Thus, an OFDM-symbol consists of 2 k or 8 k sub-carriers respectively. However, not all of the sub-carriers can be used for data transmission. A number of the sub-carriers are used either for the spectral limitation of the transmission signal or for the transmission of pilot information.

A number of OFDM symbols are combined to form an OFDM DVB-T frame. One frame of an OFDM DVB-T Signal is composed of 68 symbols each having 1705 active carriers in a N=2K mode, or 6817 active carriers in a N=8K mode, respectively. The active carriers of each symbol include data subcarriers and pilot subcarriers. The data subcarriers are digital signals corresponding to audio/video information to be transmitted and received and the pilot subcarriers are digital signals to be used for synchronization, mode detection, channel estimation, etc. A pilot subcarrier is inserted between neighboring data subcarriers in a predetermined position.

Orthogonal Frequency Division Multiplex (OFDM) systems are very sensitive to phase noise (e.g., caused by oscillator instabilities). The phase noise may be resolved into two components, namely the Common Phase Error (CPE), also known as average phase noise offset, which affects all the subchannels equally, and the Inter Carrier Interference (ICI), which is caused by the loss of orthogonality of the subcarriers.

FIG. 1 is a block diagram of a conventional OFDM signal receiver 100. Referring to FIG. 1, the OFDM signal receiver includes an RF (Radio Frequency) module 110, a demodulator 120, a frequency synchronization (FS) unit 130, a FFT (Fast Fourier Transform) unit 140, an equalizer (EQ) 150, a Common Phase Error (CPE) estimation and correction unit 160, and a demapper 170.

The demodulator 120 demodulates a digital OFDM signal output from the RF module 110 (received in a signaling format such as QPSK, BPSK or QAM), to generate an in-phase (I) signal (referred to as I-signal hereinafter) and a quadrature-phase (Q) signal (referred to as Q-signal hereinafter), which are complex signals. The demodulator 120 down-converts the digital OFDM signal is into a low-frequency signal and demodulates it. A frequency offset of the demodulated signal is compensated while the demodulated signal passes through the frequency synchronization (FS) unit 130. The frequency synchronization (FS) unit 130 estimates the frequency offset from the demodulated signal. When an estimation error is generated due to noise and channel distortion, the signal compensated by the frequency synchronization unit 130 may include a residual frequency offset. The signal compensated by the frequency synchronization unit 130 passes through the FFT unit 140, and is then equalized by the equalizer (EQ) 150. The CPE estimation and correction unit 160 estimates and corrects a Common Phase Error (CPE) equally generated in all subcarriers of the OFDM signal. A CPE is the difference between the phase of the original (transmitted) signal and the phase of a received signal, and is equally generated in all subcarriers. It is known that the CPE may be caused by a residual frequency offset and phase noise in the output of an oscillator included in the RF module 110. In the aforementioned conventional technique, pilot subcarriers are used to estimate the CPE. The pilot subcarriers may be used to transmit promised (predetermined, expected) values between a transmitter and a receiver in an OFDM system. The pilot subcarriers may be used by the receiver to estimate a frequency offset or channel distortion.

In general, the CPE can be estimated using phase rotation generated in the pilot subcarriers because it is a common phase error generated in all subcarriers. The CPE may equal a value, $\Delta\hat{\phi}_r$, obtained by estimating the quantity of phase rotation generated in carriers due to a residual frequency offset and can be represented as follows:

$$\Delta\hat{\phi}_r = \tan^{-1}\left[\sum_{k \in P} R_k \cdot S_k^*\right], P = \{-21, -7, +7, +21\} \quad \text{[Equation 1]}$$

wherein k represents a subcarrier index and $S_k$ and $R_k$ respectively denote a transmitted (expected) value and a received value with respect to the pilot subcarriers.

The CPE estimation and correction unit 160 extracts pilot subcarriers from the equalized signal output from the equalizer 150, multiplies complex numbers of the extracted pilot subcarriers $R_k$ by conjugate complex numbers of the transmitted original (expected) pilot subcarriers $S_k$, sums up the multiplication results, and estimates the $\tan^{-1}$ value of the complex value obtained from the overall result to be the quantity of phase rotation, $\Delta\hat{\phi}_r$. In Equation 1, the set P is an example of an IEEE802.11a WLAN (Wireless Local Area Network) standard and, in such a case, subcarriers −21, −7, +7 and +21 (of 64 subcarriers −32 through +31) are used as pilot subcarriers.

As described above, the CPE can be estimated using a phase variation between the transmitted (expected) pilot value and the received pilot value. However, a CPE estimation error can be generated when there is noise or channel distortion. Although the number of pilots can be increased to improve CPE estimation accuracy, the total transmission rate of the system would be reduced. Thus, the number of pilots should be appropriately determined. In particular, when a total of four pilots are used, as described above, conventional CPE estimation accuracy is low and thus the system can become sensitive to noise and channel distortion.

SUMMARY OF THE INVENTION

An aspect of the present invention provides an Orthogonal Frequency Division Multiplexing (OFDM) signal receiver adapted to estimate a Common Phase Error (CPE) with greater reliability using data subcarriers (e.g., determined by a Decision Directed (DD) estimation algorithm) in addition to pilot subcarriers, thus improving system performance.

Another aspect of the present invention provides a method of estimating the Common Phase Error (CPE) using the data subcarriers in addition to the pilot subcarriers, in an OFDM signal receiver.

According to an aspect of the present invention, there is provided an OFDM signal receiver including: an equalizer, a channel measurement unit, a CPE estimation unit, and a CPE compensation unit. The equalizer equalizes an input (received) baseband signal. The channel measurement unit estimates a channel characteristic from the input (received) baseband signal to generate information about good subcarrier indexes in the form of channel State Information (CSI). The CPE estimation unit estimates good pilot subcarriers and good data subcarriers from the equalized signal based on the CSI, calculates first and second CPEs from the estimated subcarriers, and (variously, selectively) combines the first and second CPEs to generate a final CPE. The CPE compensation unit compensates the phase of the equalized signal by the final CPE and outputs the phase-compensated signal.

The OFDM signal receiver further includes a demodulator, a frequency synchronization unit, and a Fast Fourier Transform (FFT) unit. The demodulator demodulates a digital OFDM signal input from an RF module to generate a complex signal. The frequency synchronization unit compensates a frequency offset of the demodulated signal. The FFT unit fast-Fourier-transforms the frequency-compensated signal to generate the input baseband signal.

The OFDM signal receiver further comprises a demapper demapping the phase-compensated signal according to a pre-determined symbol-mapping format.

According to another aspect of the present invention, there is provided an OFDM signal receiving method including: equalizing an input (received) baseband signal; estimating a channel from the input (received) baseband signal to generate CSI about good subcarrier indexes; estimating good pilot subcarriers and good data subcarriers from the equalized signal based on the CSI; calculating first and second CPEs from the estimated subcarriers; combining (e.g., averaging or selecting one of) the first and second CPEs to generate a final CPE; and compensating the phase of the equalized signal with the final CPE.

BRIEF DESCRIPTION OF THE DRAWINGS

The above and other features and advantages of the present invention will become more apparent by describing in detail exemplary embodiments thereof with reference to the attached drawings. The invention may, however, be embodied in many different forms and should not be construed as being limited to the embodiments set forth herein; rather, these embodiments are provided so that this disclosure will be thorough and complete, and will fully convey the concepts of the invention to those skilled in the art. Throughout the drawings, like reference numerals refer to like elements, and.

DETAILED DESCRIPTION OF EXEMPLARY EMBODIMENTS OF THE INVENTION

Figure 1:
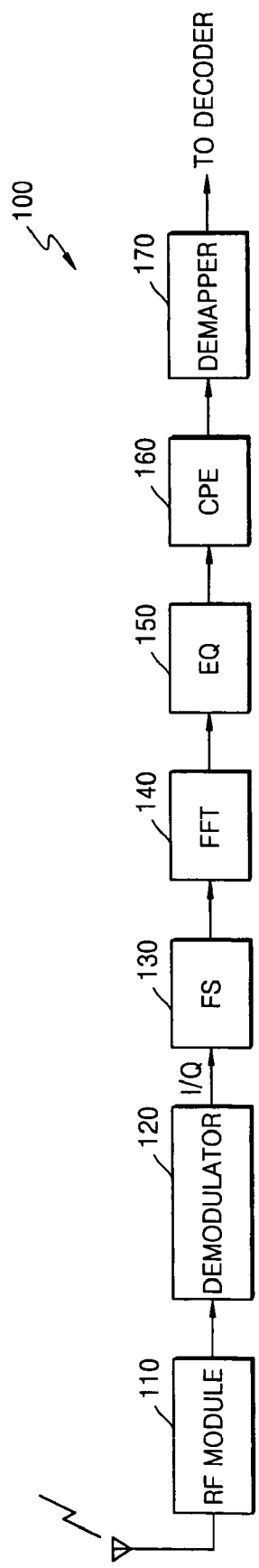
FIG. 1 is a block diagram of a conventional OFDM signal receiver.
Figure 2:
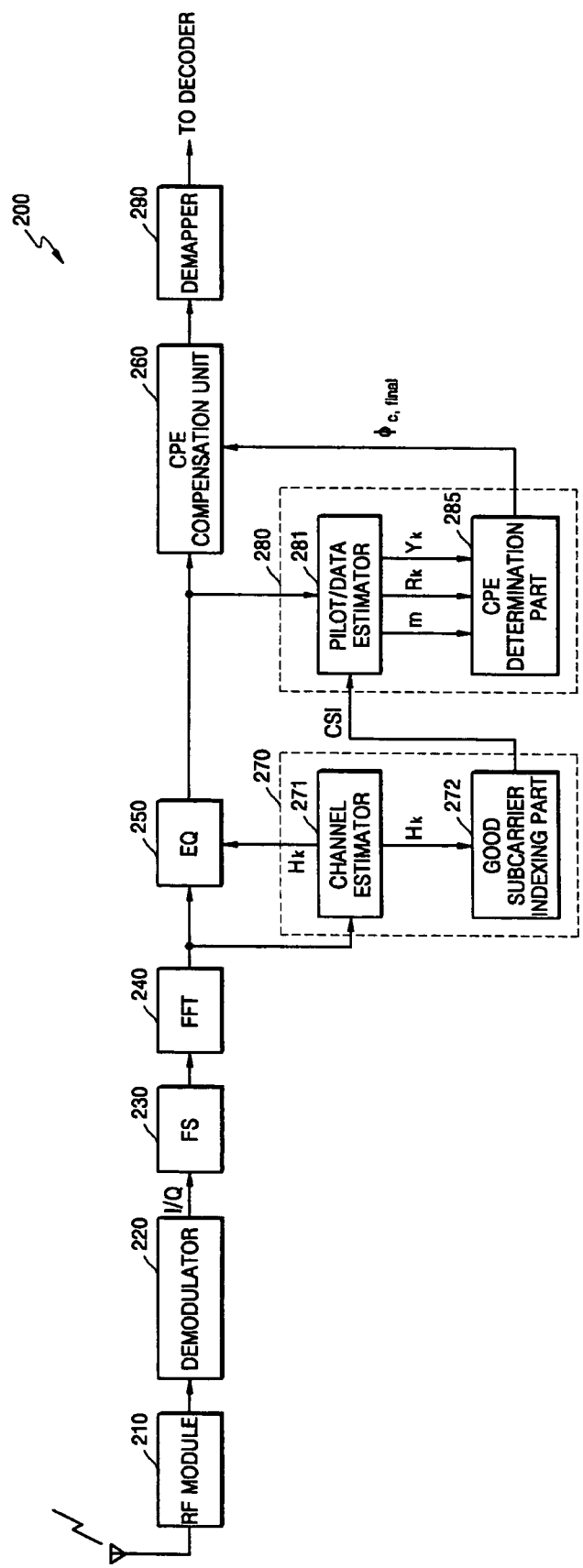
FIG. 2 is a block diagram of an OFDM signal receiver according to an embodiment of the present invention.

FIG. 2 is a block diagram of an OFDM signal receiver 200 according to an embodiment of the present invention. Referring to FIG. 2, the OFDM signal receiver 200 includes an RF module 210, a demodulator 220, a frequency synchronization unit 230, a Fast Fourier Transform (FFT) unit 240, an equalizer 250, a channel measurement unit 270, a Common Phase Error (CPE) estimation unit 280, a Common Phase Error (CPE) compensation unit 260, and a demapper 290.

The demodulator 220 demodulates a digital OFDM signal output from the RF module 210 (e.g., received in a format such as QAM (Quadrature Amplitude Modulation), BPSK (Binary Phase-Shift Keying), QPSK (Quadrature Phase-Shift Keying), etc.) to generate an I-signal and a Q-signal, which are complex signals. The demodulator 220 down-converts the digital OFDM signal output from the RF module 210 into a low-frequency signal and demodulates it. The demodulator 220 includes a synchronization circuit that reconstructs required synchronization signals including a chip-rate clock signal and a symbol-rate clock signal. The demodulated signal output from the demodulator 220 is a baseband sampled complex signal. The frequency synchronization FS unit 230 compensates a frequency offset of the demodulated signal. The FFT unit 240 fast-Fourier-transforms the compensated frequency offset signal. FFT is well known in the art. The fast-Fourier-transformed baseband signal is a frequency domain complex signal. The equalizer 250 equalizes the fast-Fourier-transformed baseband signal. The equalizer 250 can equalize the signal using channel coefficients $H_k$ associated with subcarriers estimated by a channel estimator 271 included in the channel measurement unit 270.

The OFDM signal receiver 200 estimates a CPE using data subcarriers in addition to pilot subcarriers. For performing this method of estimating the CPE, the channel measurement unit 270 generates Channel State Information (CSI) and outputs the CSI to the Pilot/Data subcarrier estimator 281 in the CPE estimation unit 280. The channel measurement unit 270 estimates a channel from the fast-Fourier-transformed baseband signal to generate information about good subcarrier indexes as Channel State Information (CSI). The subcarrier estimator 281 uses the CSI (from the channel measurement unit 270) and the equalized signal (from the equalizer 250) to estimate the good pilot subcarriers $R_k$ and good data subcarriers $Y_k$. The subcarrier estimator 281 of the CPE estimation unit 280 estimates good pilot subcarriers $R_k$ and good data subcarriers $Y_k$ from the equalized (from equalizer EQ) signal based on the CSI and the CPE determination part 285 of the CPE estimation unit 280 calculates a first CPE $\hat{\phi}_c$ and a second CPE $\hat{\phi}_{c,data}$ and a final CPE $\phi_{c,final}$ from the estimated subcarriers $R_k$ and $Y_k$.

The CPE compensation unit 260 compensates for the common phase error CPE of the equalized signal by the final CPE $\phi_{c,final}$. The demapper 290 demaps the equalized phase-compensated (equalized, CPE-compensated) signal according to a predetermined symbol-mapping format such as QAM, QPSK or BPSK. The demapped signal is output to a Viterbi decoder or an RS (Reed Solomon) decoder. The decoder performs forward error correction (FEC) on the received signal and decodes the signal. The decoded signal is processed by a predetermined signal processor to generate video display and audio signals such that a viewer may watch and hear a program broadcast corresponding to the display and audio signals of a TV broadcast.

Figure 4:
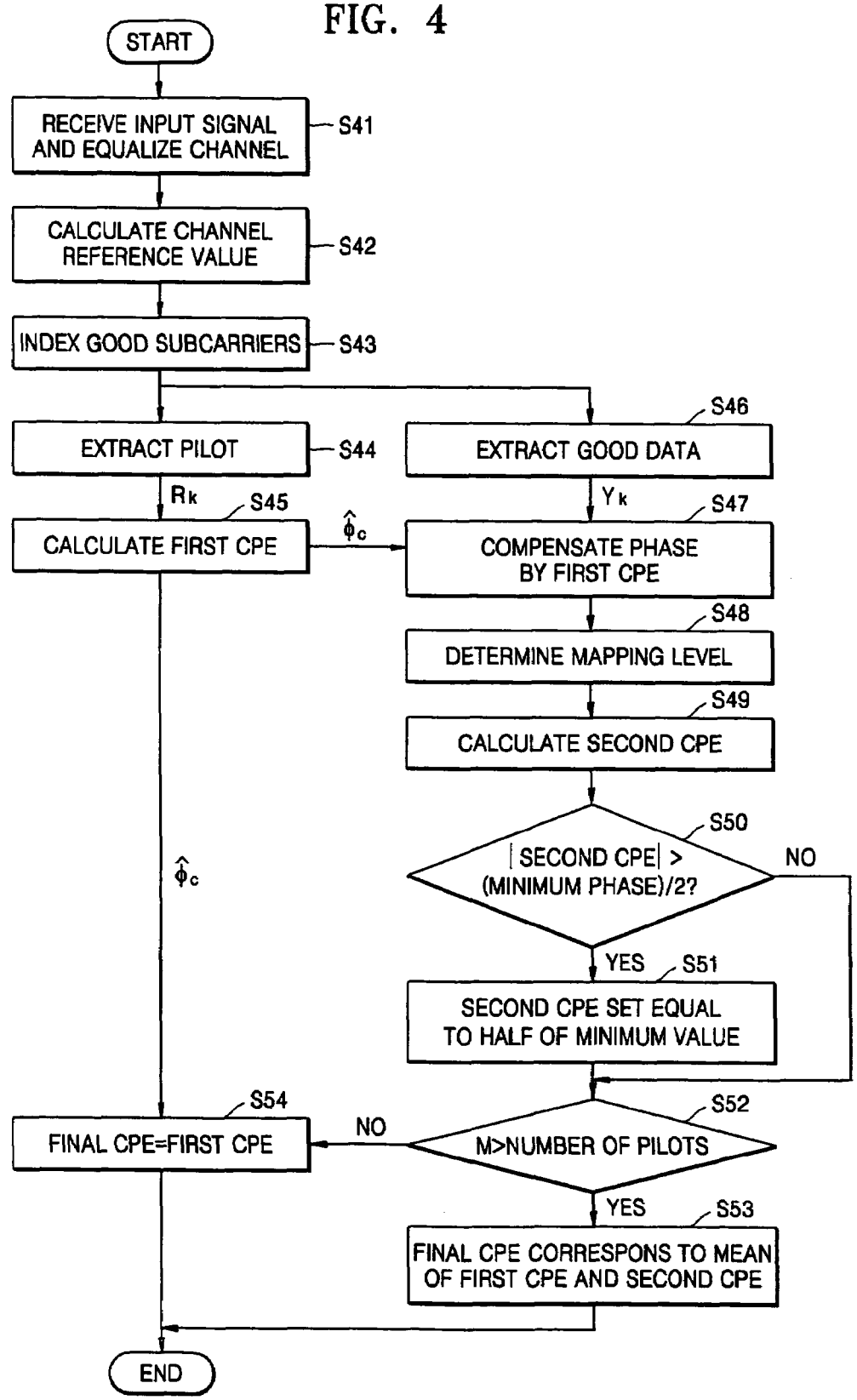
FIG. 4 is a flow chart of the method of operation of the OFDM signal receiver of FIG. 2.

FIG. 4 is a flow chart of the method of operation of the OFDM signal receiver of FIG. 2.

The operations of the channel measurement unit 270 and the CPE estimation unit 280 will now be explained in more detail with reference to the flow chart in FIG. 4.

As an overview: First, the channel measurement unit 270 and the equalizer EQ 250 continuously receive the fast-Fourier-transformed baseband signal (step S41); The channel measurement unit 270 continuously estimates a channel to generate the CSI while the equalizer 250 continuously equalizes the fast-Fourier-transformed baseband signal (step S41); The CPE estimation unit 280 continuously generates the final CPE $\phi_{c,final}$ from the equalized signal based on the CSI (step S53).

The channel measurement unit 270 (FIG. 2) includes the channel estimator 271 and a good subcarrier indexing part 272. The channel estimator 271 continuously estimates the channel from the fast-Fourier-transformed signal to generate the channel coefficients $H_k$ corresponding to respective subcarriers. Each channel coefficient $H_k$ corresponds to the magnitude of channel frequency response associated with (is proportional to) the power of each subcarrier. The good subcarrier indexing part 272 calculates the mean $|\overline{H}|^2$ of the powers of the channel coefficients $H_k$ as a channel reference value (step S42). The mean $|\overline{H}|^2$ of the powers of the channel coefficients $H_k$ is defined in Equation 2 as follows:

$$|\overline{H}|^2 = \frac{1}{52} \sum_{k=-26, k \neq 0}^{26} |H_k|^2 \qquad \text{[Equation 2]}$$

where k is a subcarrier index (ranging from −26 to 26), and the absolute values of the channel coefficients $H_k$ are proportional to the powers of the respective subcarriers. In Equation 2, it is assumed that the number of effective subcarriers is known to be 52. Thus, the FFT length used in the system is 64 but there are 52 effective subcarriers. Furthermore, 4 of the 52 effective subcarriers are pilot subcarriers and 48 of them are data subcarriers.

The good subcarrier indexing part 272 indexes as good subcarriers, the plurality of subcarriers for which the powers of each of their corresponding channel coefficient $H_k$ generated by the channel estimator 271 are larger than half of the mean $|\overline{H}|^2$, as shown in Decision 3, to generate the CSI about the index k (S43).

$$|H_k|^2 > \frac{|\overline{H}|^2}{2} ? \qquad \text{[Decision 3]}$$

When the good subcarriers are indexed, the CPE estimation unit 280 determines the final CPE $\phi_{c,final}$ from the equalized signal based on the CSI generated by the channel measurement unit 270.

Referring to FIG. 2, the CPE estimation unit 280 includes a subcarrier estimator 281 and a CPE determination part 285. The subcarrier estimator 281 estimates the good pilot subcarriers $R_k$ and good data subcarriers $Y_k$. The CPE determination part 285 calculates the first CPE $\hat{\phi}_c$ and the second CPE $\hat{\phi}_{c,data}$ and combines the first and second CPEs to generate the final CPE $\phi_{c,final}$.

Figure 3:
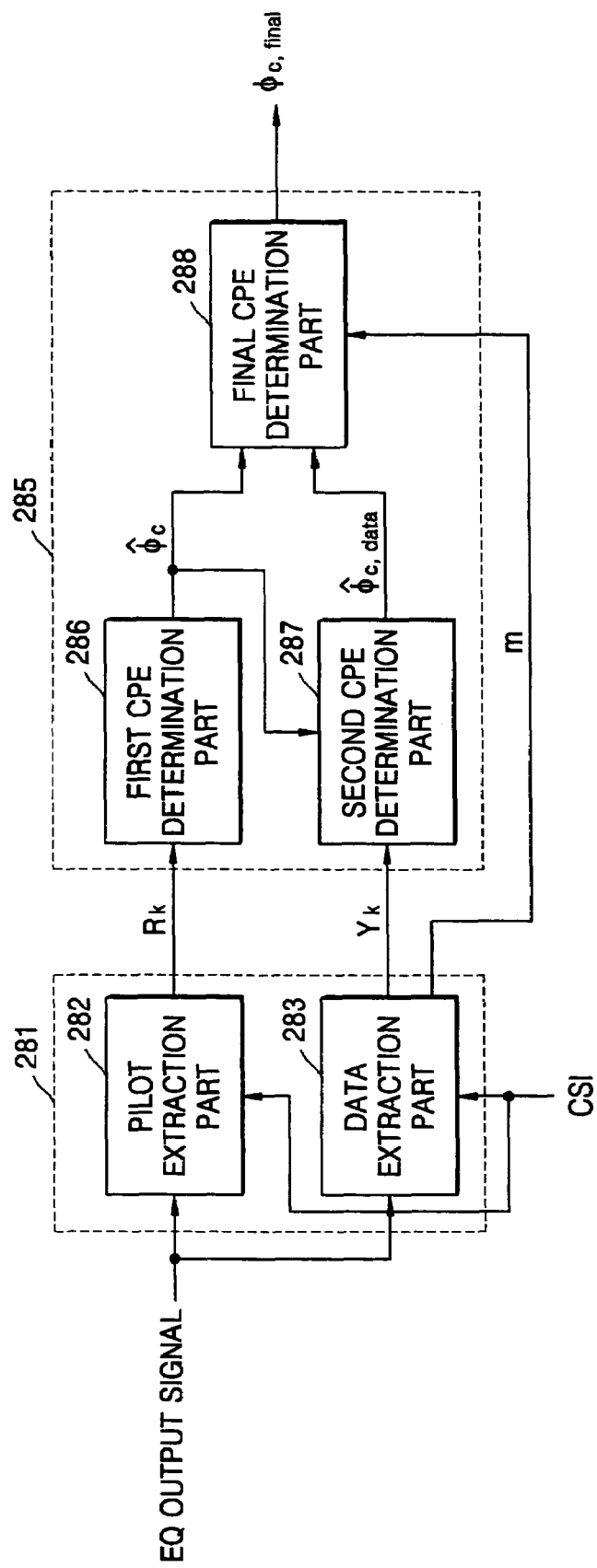
FIG. 3 is a block diagram of the subcarrier estimation unit 281 and the CPE determination unit 285 shown in FIG. 2.

FIG. 3 is a block diagram of the CPE estimation unit 280 shown in FIG. 2 comprised of the subcarrier estimator 281 and the CPE determination part 285. Referring to FIG. 3, the subcarrier estimator 281 includes a pilot extraction part 282 and a data extraction part 283; and the CPE determination part 285 includes a first CPE determination part 286, a second CPE determination part 287 and a final determination part 288.

The pilot extraction part 282 outputs pilot subcarriers (judged to be "good" subcarriers) based on their having channel coefficient powers larger than half of the mean $|\overline{H}|^2$ as the "good" pilot subcarriers $R_k$ based on the CSI (step S44). Here, pilots having "bad" channel characteristics (those not having channel coefficient powers larger than half of the mean $|\overline{H}|^2$) are eliminated in order to improve CPE estimation accuracy.

The data extraction part 283 outputs data subcarriers having real components $Re(Y_k)$ and imaginary components $Im(Y_k)$ larger than half of a maximum mapping level according to the constellation among data subcarriers. The data extraction part 283 selects and outputs as the "good" data subcarriers $Y_k$ those among the good subcarriers (having channel coefficient $H_k$ powers larger than half of the mean $|\overline{H}|^2$ based on the CSI (step S46)), that satisfy Condition 4 as follows:

IF ({k is "good subcarrier"}&{$Re(Y_k)$>(maximum size)/2}&{$Im(Y_k)$>(maximum size)/2}), THEN k is "selected" [Condition 4]

Here, data having "bad" channel characteristics (not satisfying condition 4) are eliminated in order to improve the CPE estimation accuracy.

Figure 5:
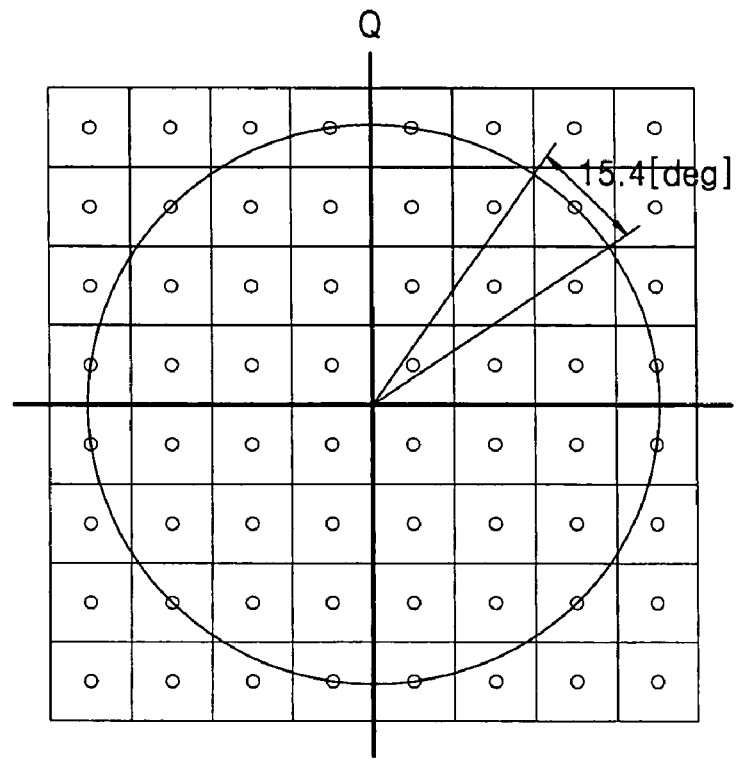
FIG. 5 is an I-Q constellation graph in 64-QAM format.
Figure 6:
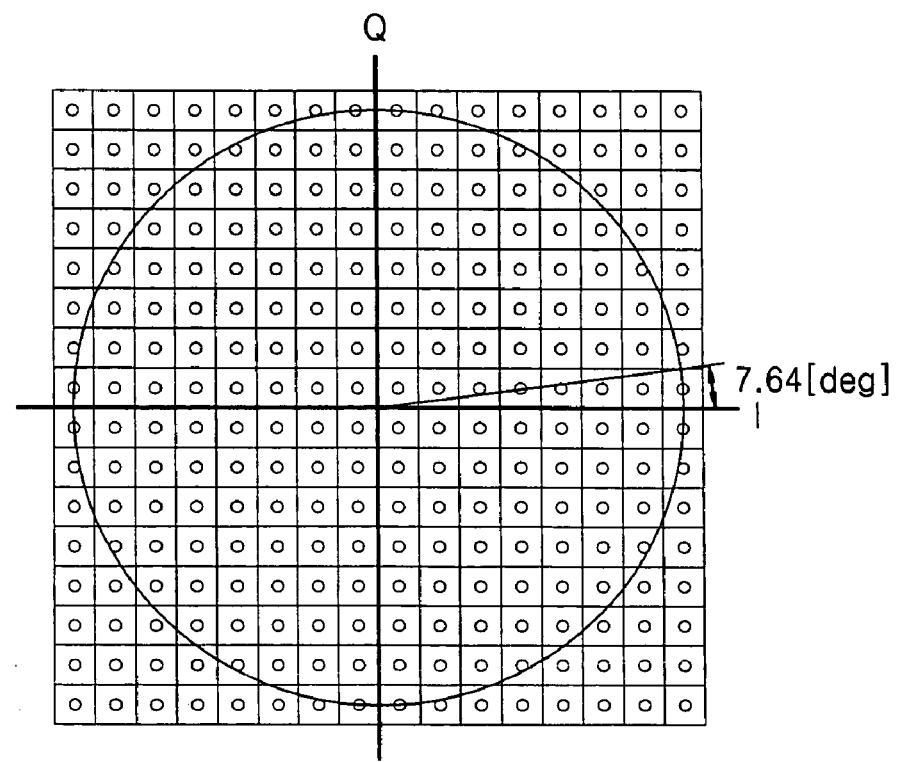
FIG. 6 is an I-Q constellation graph in 256-QAM format.

FIG. 5 is an I-Q constellation graph in 64-QAM symbol-mapping format, and FIG. 6 is an I-Q constellation graph in 256-QAM symbol-mapping format. Here, half of the maximum mapping level corresponds to two blocks in each of four directions (horizontal and vertical) from the center point in 64-QAM and four blocks in each of four directions (horizontal and vertical) from the center point in 256-QAM.

Furthermore, the data extraction part 283 (FIG. 3) generates the number (m) of good data subcarriers existing within the FFT length (for example, 64) used in the system.

The first CPE determination part 286 (FIG. 3) calculates the estimated quantity of phase rotation $\Delta\hat{\phi}_r$ using the good pilot subcarriers $R_k$ (extracted by the pilot extraction part 282), as represented by Equation 1. Here, the estimated quantity of phase rotation $\Delta\hat{\phi}_r$ is generated as the first CPE $\hat{\phi}_c$ (step S45). Thus, the first CPE $\hat{\phi}_c$ equals $\Delta\hat{\phi}_r$ of Equation 1 using the good pilot subcarriers $R_k$ (extracted by the pilot extraction part 282.

The second CPE determination part 287 (FIG. 3) first performs phase compensation on the good data subcarriers $Y_k$ (extracted by the data extraction part 283) by using the first CPE $\hat{\phi}_c$ (S47). Then, the second CPE determination part 287 determines mapping levels $G_k$ according to the constellation for the data subcarriers phase-compensated by the first CPE $\hat{\phi}_c$ (step S48), and as shown in Equation 5. In Equation 5, $\Pi$ represents a symbol decision making process according to the constellation (such as 256-QAM).

$$G_k = \prod_{256-QAM} (Y_k e^{-j\hat{\phi}_c}), k \text{ is "selected"} \quad \text{[Equation 5]}$$

When the mapping levels $G_k$ are determined, the second CPE determination part 287 (FIG. 3) generates the quantity of phase rotation for the good data subcarriers $Y_k$ as the second CPE $\hat{\phi}_{c,data}$ based on the mapping levels $G_k$ (step S49), and as shown in Equation 6.

$$\hat{\phi}_{c,data} = \tan^{-1}\left(\sum_{k \text{ is "slected"}} Y_k G_k^*\right) \quad \text{[Equation 6]}$$

While Equation 6 is similar to Equation 5, in Equation 6 the quantity of phase rotation is calculated as a reference phase using the phase of the mapping levels $G_k$ instead of the phase of the transmitted value $S_k$ of the subcarriers.

Here, the second CPE determination part 287 (FIG. 3) limits the range of the calculated second CPE $\hat{\phi}_{c,data}$. Thus, the second CPE determination part 287 determines whether the second CPE $\hat{\phi}_{c,data}$ is larger than half of the minimum phase between neighboring points (for example, 15.4° in 64-QAM and 7.64° in 256-QAM) in the constellations shown in FIG. 5 or FIG. 6 (S50). When the second CPE $\hat{\phi}_{c,data}$ is larger than half of the minimum phase between neighboring points, the second CPE determination part 287 restricts the second CPE $\hat{\phi}_{c,data}$ to half of the minimum phase between neighboring points (step S51). When the second CPE $\hat{\phi}_{c,data}$ is not larger than half of the minimum phase between neighboring points, the second CPE determination part 287 outputs the quantity of phase rotation calculated according to Equation 6 unchanged.

The final determination part 288 (FIG. 3) generates the final CPE $\hat{\phi}_{c,final}$ from the first CPE $\hat{\phi}_c$ and the second CPE $\hat{\phi}_{c,data}$, and based on a decision step S52 For example, when the number (m) of the good data subcarriers is larger than the number of pilot subcarriers used in the system (S52), the final determination part 288 generates the mean of the first CPE $\hat{\phi}_c$ and the second CPE $\hat{\phi}_{c,data}$ as the final CPE $\hat{\phi}_{c,final}$ (S53), as shown in Equation 7.

$$\phi_{c,final} = \frac{4*\hat{\phi}_c + m*\hat{\phi}_{c,data}}{4+m} \quad \text{[Equation 7]}$$

The final determination part 288 generates the first CPE $\hat{\phi}_c$ as the final CPE $\hat{\phi}_{c,final}$ when the number (m) of the good data subcarriers is smaller than the number of the pilot subcarriers, for example, 4, used in the system (step S54). Accordingly, the CPE compensation unit 260 (FIG. 2) compensates the phase of the equalized signal by the final CPE $\hat{\phi}_{c,final}$ and outputs the phase-compensated signal.

Figure 7:
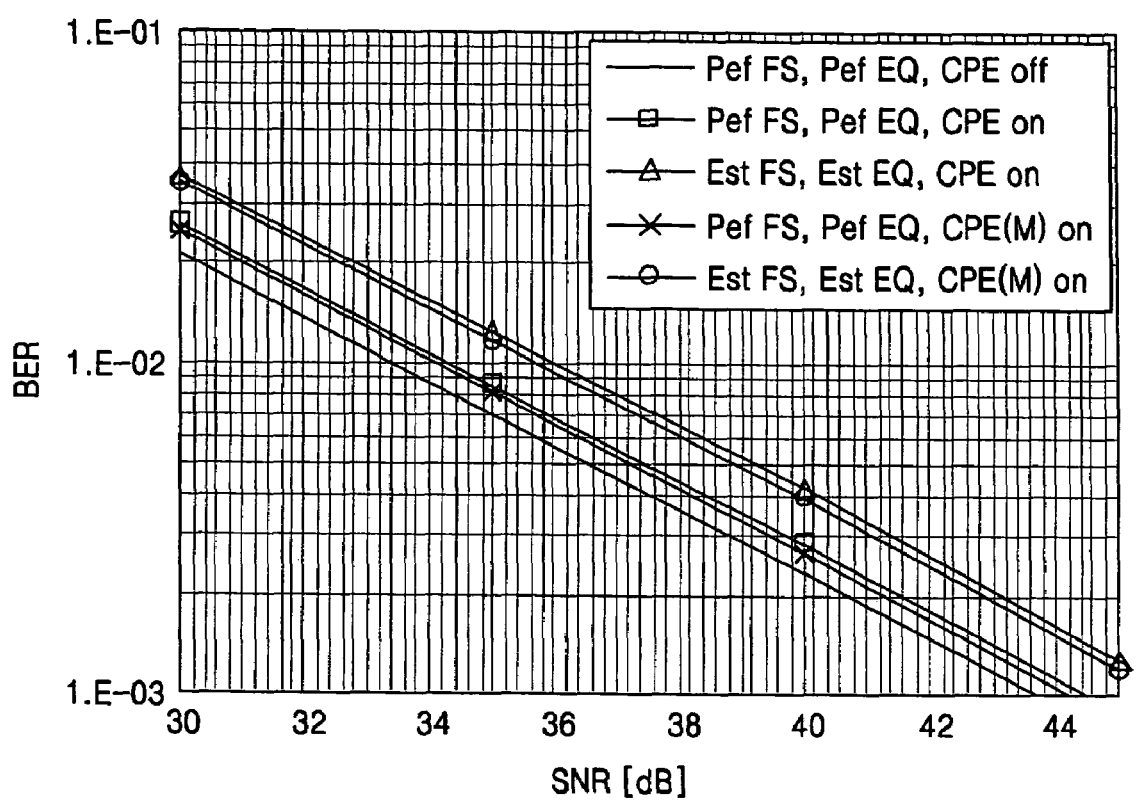
FIG. 7 is a graph illustrating the relationship between Signal to Noise Ratio (SNR) and Bit Error Rate (BER) of the OFDM signal receiver according to an embodiment of the present invention.

FIG. 7 is a graph illustrating the relationship between signal to noise ratio (SNR) and bit error rate BER of the OFDM signal receiver 200 of FIG. 2 according to embodiments of the present invention. In this simulation, 256-QAM modulation was used. The simulation result represents the performance of a multipath fading channel having a Root Mean Square (RMS) delay spread of 50 ns in an indoor wireless environment.

FIG. 7 also shows the performances of a conventional OFDM signal receiver ("Pef FS, Pef EQ, CPE on"/"Est FS, Est EQ, CPE on") for comparison with the OFDM signal receiver of the present invention ("Pef FS, Pef EQ, CPE(M) on"/"Est FS, Est EQ, CPE(M) on"), and are compared to an ideal case ("Pef FS, Pef EQ, CPE off") having perfect frequency offset compensation and equalization and no CPE estimation. When perfect frequency offset compensation and equalization are accomplished ("Pef FS, Pef EQ"), the OFDM signal receiver according to the present invention ("CPE(M) on"), which is operated according to the CPE estimation unit 280 (FIGS. 2 & 3), can improve the SNR by 0.3 dB over the conventional OFDM signal receiver ("CPE on"). Furthermore, when frequency offset compensation and equalization are estimated ("Est FS, Est EQ"), the present invention ("CPE(M) on") can improve the SNR by 0.3 dB over the conventional technique ("CPE on").

As described above, in the OFDM signal receiver 200 (FIG. 2) according to embodiments of the present invention, the channel measurement unit 270 estimates a channel from the fast-Fourier-transformed signal to generate the CSI about good subcarrier indexes. Furthermore, the CPE estimation unit 280 estimates the good pilot subcarriers $R_k$ and good data subcarriers $Y_k$ from the equalized signal output from the equalizer 250 according to the CSI, calculates the first CPE $\hat{\phi}_c$ and the second CPE $\hat{\phi}_{c,data}$ and combines them variously to generate the final CPE $\hat{\phi}_{c,final}$. Accordingly, the CPE compensation unit 260 compensates the phase of the equalized signal by the final CPE $\hat{\phi}_{c,final}$ and outputs the phase-compensated signal.

As described above, the OFDM signal receiver according to the present invention estimates the CPE using the data subcarriers determined with high reliability in addition to the pilot subcarriers. Accordingly, CPE estimation accuracy and system performance can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An Orthogonal Frequency Division Multiplexing (OFDM) signal receiver comprising:
   an equalizer configured to equalize an received baseband signal to provide an equalized signal;
   a channel measurement unit configured to estimate a channel characteristic from the received baseband signal and to generate information about good subcarrier indexes as Channel State Information (CSI);
   a Common Phase Error (CPE) estimation unit configured to estimate good pilot subcarriers and good data subcarriers from the equalized signal based upon the CSI, to calculate a first CPE and to calculate a second CPE from the estimated good data subcarriers, wherein the CPE estimation unit comprises:
 a subcarrier estimator configured to estimate the good pilot subcarriers and the good data subcarriers; and
 a CPE determination part configured to calculate the first CPE and the second CPE and to combine the first CPE and the second CPE to generate a final CPE.

2. The OFDM signal receiver of claim 1, further comprising:
 a demodulator configured to demodulate a digital OFDM signal output from an RF module to generate a complex signal;
 a frequency synchronization unit configured to compensate a frequency offset of the demodulated signal; and
 a FFT unit configured to fast-Fourier-transform the frequency-compensated signal to generate the received baseband signal.

3. The OFDM signal receiver of claim 1, wherein the Common Phase Error (CPE) estimation unit is further configured to calculate a first CPE from the estimated pilot subcarriers.

4. The OFDM signal receiver of claim 3, wherein the Common Phase Error (CPE) estimation unit is further configured to combine the first CPE and the second CPE and to generate a final CPE.

5. The OFDM signal receiver of claim 4, further comprising a CPE compensation unit configured to compensate the phase of the equalized signal by the final CPE and outputting a phase-compensated signal.

6. The OFDM signal receiver of claim 5, further comprising a demapper configured to demap the phase-compensated signal according to a predetermined symbol mapping format.

7. The OFDM signal receiver of claim 6, wherein the predetermined symbol mapping format is one of QPSK, BPSK or QAM.

8. The OFDM signal receiver of claim 1, wherein the channel measurement unit comprises:
 a channel estimator configured to estimate the channel from the received baseband signal to generate channel coefficients related to respective subcarriers; and
 an indexing part configured to calculate the mean of the powers of the channel coefficients and to index subcarriers having channel coefficient powers larger than half of the mean as the good subcarriers and to generate information about the indexes as the CSI.

9. The OFDM signal receiver of claim 1, wherein the subcarrier estimator comprises:
 a pilot extraction part configured to output pilot subcarriers as the good pilot subcarriers that have channel coefficient powers larger than half of the mean of the powers of the channel coefficients; and
 a data extraction part configured to output data subcarriers as the good data subcarriers that have real components and imaginary components larger than half of a maximum mapping level according to constellation among data subcarriers having channel coefficient powers larger than half of the mean of the powers of the channel coefficients.

10. The OFDM signal receiver of claim 9, wherein the data extraction part is configured to generate the number of the good data subcarriers within a FFT length used in a system employing the OFDM signal receiver.

11. The OFDM signal receiver of claim 10, wherein the CPE determination part comprises:

a first CPE determination part configured to output the a quantity of phase rotation with respect to the good pilot subcarriers as the first CPE;
a second CPE determination part configured to output the a quantity of phase rotation with respect to the good data subcarriers as the second CPE; and
a final CPE determination part configured to output a combination of the first and second CPEs as the final CPE.

12. The OFDM signal receiver of claim 11, wherein the final CPE determination part outputs the mean of the first and second CPEs as the final CPE when the number of the good data subcarriers is larger than the number of pilot subcarriers used in the system employing the OFDM signal receiver; and outputs the first CPE as the final CPE when the number of the good data subcarriers is not larger than the number of pilot subcarriers.

13. The OFDM signal receiver of claim 11, wherein the second CPE determination part performs phase compensation on the good data subcarriers using the first CPE, determines mapping levels according to constellation, and generates as the second CPE the quantity of phase rotation with respect to the good data subcarriers referencing the determined mapping levels.

14. The OFDM signal receiver of claim 13, wherein the maximum value of the second CPE is restricted to half of the minimum phase between neighboring points in a constellation.

15. An OFDM signal receiving method using an OFDM signal receiver comprising:
 equalizing a received baseband signal to provide an equalized signal;
 estimating a channel from the received baseband signal to generate Channel State Information (CSI) about good subcarrier indexes;
 estimating good pilot subearriers and good data subcarriers from the equalized signal based upon the CSI to provide estimated good pilot subcarriers and estimated good data subcarriers respectively;
 calculating a first common phase error (CPE) from the estimated good pilot subcarriers;
 calculating a second common phase error (CPE) from the estimated good data subcarriers; and
 combining the first CPE and the second CPE to generate a final CPE corresponding to a difference in phase between transmitted audio/video information from a transmitter and received audio/video information by a receiver.

16. The OFDM signal receiving method of claim 15, further comprising:
 compensating the phase of the equalized signal by the final CPE to provide a phase-compensated signal.

17. The OFDM signal receiving method of claim 16, further comprising:
 demodulating a digital OFDM signal input from an RF module to generate a complex signal;
 compensating a frequency offset of the demodulated signal; and
 fast-Fourier-transforming the frequency-compensated signal to generate the received baseband signal.

18. The OFDM signal receiving method of claim 16, further comprising demapping the phase-compensated signal according to a predetermined symbol mapping format.

19. The OFDM signal receiving method of claim 18, wherein the predetermined symbol mapping format is one of QPSK, BPSK or QAM.

20. The OFDM signal receiving method of claim 15, wherein generating the CSI comprises:

estimating the channel from the received baseband signal to generate channel coefficients corresponding to respective subcarriers;

calculating the mean of the powers of the channel coefficients; and indexing subcarriers having channel coefficient powers larger than half of the mean as the good subcarriers to generate information about the indexes as the CSI.

21. The OFDM signal receiving method of claim 20, wherein the estimating the good pilot subcarriers and good data subcarriers comprises:

outputting as the good pilot subcarriers the pilot subcarriers that have channel coefficient powers larger than half of the mean of the powers of the channel coefficients; and outputting as the good data subcarriers the data subcarriers that have real components and imaginary components larger than half of a maximum mapping level according to constellation among data subcarriers having channel coefficient powers larger than half of the mean of the powers of the channel coefficients.

22. The OFDM signal receiving method of claim 21, further comprising generating the number of the good data subcarriers existing in an FFT length used in a system employing the OFDM signal receiver.

23. The OFDM signal receiving method of claim 22, further comprising:

generating as the first CPE a quantity of phase rotation with respect to the good pilot subcarriers;

generating as the second CPE a quantity of phase rotation with respect to the good data subcarriers; and generating the mean of the first CPE and the second CPE as the final CPE when the number of the good data subcarriers is larger than the number of pilot subcarriers used in the system employing the OFDM signal receiver, and generating the first CPE as the final CPE when the number of the good data subcarriers is not larger than the number of pilot subcarriers.

24. The OFDM signal receiving method of claim 23, wherein generating the second CPE comprises:

performing phase compensation on the good data subcarriers with the first CPE and determining mapping levels according to constellation; and generating as the second CPE the quantity of phase rotation with respect to the good data subcarriers referencing the determined mapping levels.

25. The OFDM signal receiving method of claim 24, wherein the maximum value of the second CPE is restricted to half of the minimum phase between neighboring points in a constellation.

* * * * *